United States Patent [19]

Neumann et al.

[11] Patent Number: 4,783,696
[45] Date of Patent: Nov. 8, 1988

[54] COLOR IMAGE INPUT APPARATUS WITH VARIOUS ELEMENTS HAVING MATCHED APERTURES

[75] Inventors: Hans D. Neumann, Los Altos; Anatoly Rabinovich, Mtn. View, both of Calif.

[73] Assignee: Hewlett-Packard Company, Palo Alto, Calif.

[21] Appl. No.: 938,546

[22] Filed: Dec. 5, 1986

[51] Int. Cl.⁴ .......................... G03F 3/08; H04N 1/46
[52] U.S. Cl. ...................................... 358/75; 250/226
[58] Field of Search .................. 358/75, 75 IJ, 76, 78, 358/80; 250/226

[56] References Cited

U.S. PATENT DOCUMENTS

| | | | |
|---|---|---|---|
| 2,567,240 | 9/1951 | Sites | 358/75 |
| 4,469,433 | 9/1984 | Kurata et al. | 358/75 |
| 4,500,918 | 2/1985 | Koumura et al. | 358/75 |
| 4,676,596 | 6/1987 | Kato et al. | 358/75 |

FOREIGN PATENT DOCUMENTS

| | | | |
|---|---|---|---|
| 54-154348 | 12/1979 | Japan | 358/75 |
| 58-114568 | 7/1983 | Japan | 358/75 |
| 59-55674 | 3/1984 | Japan | 358/75 |
| 60-127863 | 7/1985 | Japan | 358/75 |
| 60-134556 | 7/1985 | Japan | 358/75 |

*Primary Examiner*—James J. Groody
*Assistant Examiner*—Randall S. Svihla
*Attorney, Agent, or Firm*—Paul L. Hickman; Edward Y. Wong; William H. F. Howard

[57] ABSTRACT

A color input image apparatus characterized by a support assembly, a sensor assembly, a beam forming assembly located between the support assembly and the sensor assembly, and a projector assembly located between the beam forming assembly and the sensor assembly. Apertures of the beam forming assembly and the projection assembly subtend substantially the same beam angle to minimize the deleterious effects of stray light. The beam forming assembly produces red, green, and blue component beams by transmissive filtering of light emanating from a portion of the color image. The beam forming assembly is positioned in the more position-tolerant object space of the apparatus, and matched apertures are used throughout to minimize the effects of stray light. Embodiments of the assembly can input an image from either color transparencies or from opaque color originals.

13 Claims, 2 Drawing Sheets

COLOR IMAGE INPUT APPARATUS WITH VARIOUS ELEMENTS HAVING MATCHED APERTURES

BACKGROUND OF THE INVENTION

1. Field of the Invention

This invention relates generally to optical apparatus, and more particularly to optical apparatus which separate color images into component parts for input into electronic systems.

2. Description of the Prior Art

It is well known that the many colors of the visual spectrum can be represented by mixtures of other colors, uuch as red, green, and blue. This fact has been used to advantage in many fields. For example, in the video field, a color image can be produced on a video screen having a large number of red, green, and blue pixels. By controlling the intensity of the light emitted from each of the color pixels, images of virtually any color can be produced.

Video, of course, is not the only field which utilizes the principles of color mixing. For example, color photocopiers utilize the same principles to produce color images on pieces of paper. However, no matter the field, the problem remains on how to efficiently separate a color image into color components for efficient input into an electronic system.

Color separation filters are often used to separate light from a color image into its various color components. There are two major types of color separation filters, namely reflective filters and transmissive filters. Reflective filters tend to be used more frequently for color separation purposes, because they can split a light beam into two beams of different colors.

A problem with reflective filters is their inefficiency at eliminating unwanted spectral frequencies. For example, a red reflective filter may reflect 99.9% of the red light impinging upon it, but it also reflects 15% of the green and the blue light. Since this can cause distortion in the reproduced color image, expensive electronic circuits are often employed to electronically separate the unwanted light signals from the desired light signals.

Once the light has been separated into component color beams by the color separation filters, they are typically focused by a projection lens assembly on optical sensors. Since the sensors are invariably smaller than the source color image, the projection lens assembly de-magnifies the source color image for projection onto the sensors. Due to this de-magnification, the positions of the optical components in the image space (the space between the projection lens assembly and the sensors) is much more critical than the position of the optical components in the object space (the space between the source color image and the projection lens assembly).

Another source of color image distortion is stray light impinging upon the optical sensors. The prior art has addressed this problem by using low-reflective baffles to block undesirable stray light.

SUMMARY OF THE INVENTION

An object of this invention is to provide a color image input apparatus which does not require extensive signal processing to compensate for poor color filtering.

Another object of this invention is to provide a color image input apparatus which minimizes the criticality of the positioning requirements of the optical components.

Yet another object of this invention is to provide a color image input apparatus which minimizes the deleterious effects of stray light.

Briefly, the invention includes a support assembly for positioning an item bearing a color image; a sensor assembly; a beam forming assembly located between the support assembly and the sensor assembly; and a projection assembly located between the beam forming assembly and the sensor assembly. The beam forming assembly develops a real and two virtual images of a portion of the color image, which are subsequently directed through three transmissive color separation filters. The apertures of the beam forming assembly, the projection assembly, and the sensor assembly, are all matched in size to minimize the effects of stray light.

An advantage of this invention is that there is minimal intermixing of the component colors prior to their impingement on the sensor assembly due to the use of transmissive color separation filters.

Another advantage of this invention is that the optical components of the beam forming assembly have less critical positioning requirements due to their location in the object space, rather than in the image space, of the apparatus.

Yet another advantage of this invention is that the effects of stray light are minimized due to the matching of the apertures of the beam forming assembly, the projection assembly, and the sensor assembly.

These and other objects and advantages of the present invention will become apparent to those skilled in the art upon a reading of the following descriptions and a study of the several figures of the drawing.

DETAILED DESCRIPTION OF THE PREFERRED EMBODIMENTS

Figure 1:
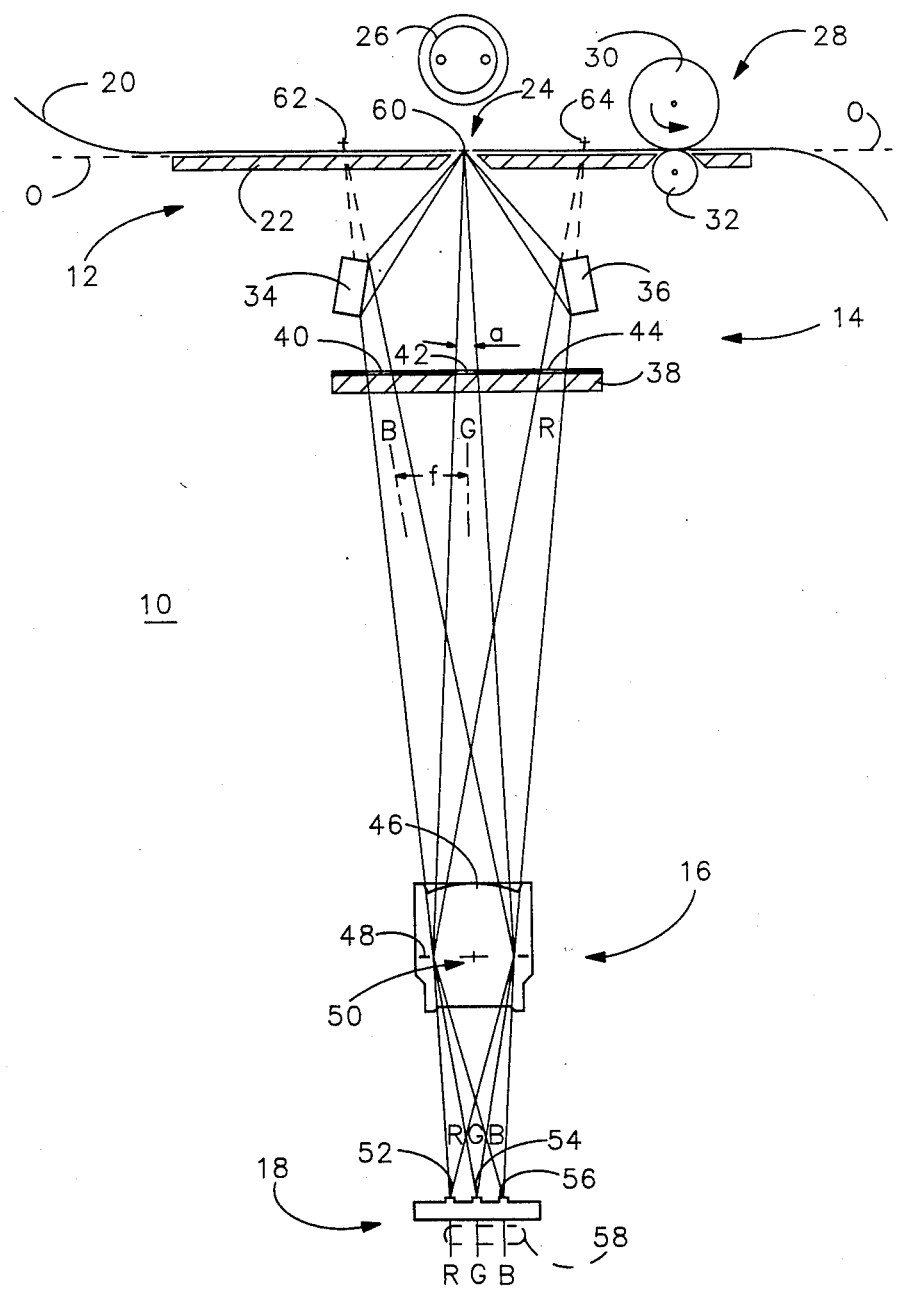
FIG. 1 is a schematic representation of an apparatus used to input color images from transparencies, slides, and the like into electronic systems.

Referring to FIG. 1, a color image input apparatus 10 includes a support assembly 12, a beam forming assembly 14, a projection assembly 16, and a sensor assembly 18. The color image input apparatus 10 is designed to input a color image borne by a transparency 20. The color image (not shown) on the transparency 20 can be formed by any number of processes including color photocopier reproduction, direct coloring, plotters, photolithography, etc.

The support assembly 12 includes a opaque platen 22 provided with an elongated aperture 24. Positioned directly above aperture 24 is a white light source 26, such as a fluorescent lamp. The transparency 20 is transported past the aperture 24 in platen 22 by a drive assembly 28, including a drive roller 30 and a pinch roller 32.

Beam forming assembly 14 includes a pair of front reflecting mirrors 34 and 36, and a filter assembly 38. The filter assembly 38 includes three filter windows 40, 42, and 44, each of which includes a transmissive color separation filter. Light shining through filter window 40 produces a blue beam B, light shining through filter window 42 produces a green beam G, and light shining through filter window 44 produces a red beam R.

Projection assembly 16 typically includes a number of lenses such as lens 46, and includes an aperture forming member or iris 48 having an aperture 50. The projection assembly 16 is used to de-magnify the color image on transparency 20 by a factor of approximately 7:1.

Sensor assembly 18 includes three photoelectric sensor arrays 52, 54, and 56. The projection assembly 16 focuses the red beam R on sensor array 52, the green beam G on sensor array 54, and the blue beam B on sensor array 56. The outputs 58 of sensor assembly 18 form an RGB signal which represents the portion of the color image on transparency 20 which is aligned with aperture 24.

In operation, the transparency 20 bearing the color image is drawn past the aperture 24 by the drive assembly 28. The portion 60 of the color image which is aligned with aperture 24 forms a "scan line" of the image, which is converted by the color image input apparatus 10 into the aforementioned RGB signal.

The white light produced by light source 26 shines through portion 60 of the color image and through aperture 24 to impinge upon mirrors 34 and 36 and the filter assembly 38. The front silvered mirrors 34 and 36 produce virtual images 62 and 64 of the portion 60 which are slightly above the object plane "O" of the color image, but which are well within the object field of projection assembly 16. The magnification error due to the positioning of the virtual images 62 and 64 slightly beyond the object plane O can be accurately calculated in advance and can be minimized by placing the mirrors 34 and 36 as close to each other as the separation of the color filter windows 40, 42, and 44 of the filter assembly 38 permits.

The beam forming assembly 14 thus accurately produces three color component beams B, G, and R, each of which has a beam angle a and which have a mutual field angle f. The beam angle a corresponds to the aperture size of filter windows 40, 42,aand 44, and to the aperture size of mirrors 34 and 36. Also, the beam angle a corresponds to the aperture 50 of iris 48 and to the apertures of photoelectric sensor arrays 52, 54, and 56.

The beams B, G, and R are transposed and focused by the projection assembly 16. The photoelectric sensor arrays 52, 54, and 56, which are typically formed from a matrix of photosensitive semiconductor devices, convert the intensities of various portions of beams R, G, and B, to form the RGB signal on outputs 58.

By placing the beam forming assembly in the object space between object plane O and projection assembly 16, the criticality of the positioning of the optical components is reduced by the de-magnification ratio of the projection assembly 16. For example, with a ratio of 7:1, the positioning tolerance of mirrors 34 and 36 and the filter assembly 38 is increased by a factor of seven in lateral directions and by a factor of forty-nine ($7^2$) in longitudinal directions, when compared to a color separation assembly placed in the image space.

Furthermore, since the filter windows 40, 42, and 44 are used in their transmission mode, the purity of the beams B, G, and R is very high. For example, a commercially available red dichroic filter only transmits approximately 1% of the incident light having wavelengths less than 550 nanometers (nm). A commercially available blue dichroic filter similarly transmits only about 1% of the incident light having wavelengths greater than 540 nm. A commercially available green dichroic transmissive filter transmits only about 1% of the incident light having wavelengths below 460 nm and above 600 nm. Therefore, commercially available transmissive filters can produce light in the red, green, and blue frequencies of approximately 99% purity.

The deleterious effects of stray light are minimzed by matching the apertures of the optical components to the beam angle a. For example, the mirrored surface areas of mirrors 34 and 36 have the aperture a, as do the apertures of filter windows 40, 42 and 44. Also, the aperture 50 of iris 48 subtends the beam angle a. Thus, in effect, the apparatus 10 of FIG. 1 has three matched apertures in the path of the beam B and beam R, and two matched apertures in the path of beam G. Furthermore, the elongated aperture 24 of platen 22 is proportionally matched to the photoelectric sensor arrays 52, 54, and 56 of the detector assembly 58. Any stray light falling out of the beam angle a will be blocked from impinging upon the photoelectric sensor arrays 52, 54, and 56 by one or more of the matched apertures in its path.

Figure 2:
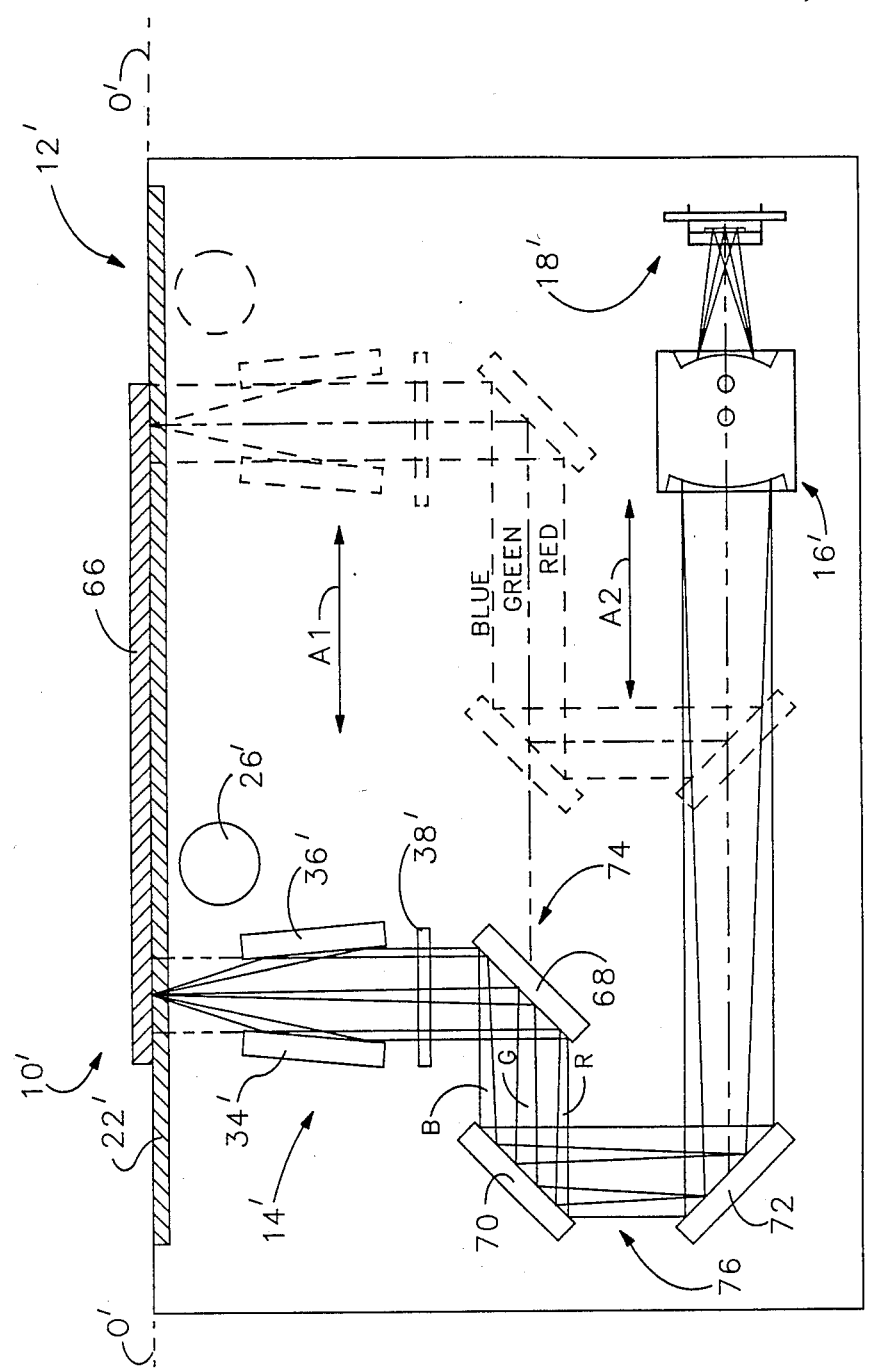
FIG. 2 is a schematic representation of an apparatus used to input color images from opaque items, such as paper, bristol board and the like into electronic systems.

Referring to FIG. 2, an alternate embodiment for a color image input apparatus 10' includes a support assembly 12', a beam forming assembly 14', a projection assembly 16', and a sensor assembly 18'. The color image input apparatus 10' is also provided with a transparent platen 22', a light source 26', a pair of mirrors 34' and 36', and a filter assembly 38'.

The color image input apparatus 10' is adapted to input a color image formed on an opaque object such as a sheet of paper 66. In addition to the aforementioned members, the alternate embodiment of FIG. 2 also includes beam directing mirrors including a first movable mirror 68, a second movable mirror 70, and a third movable mirror 72.

The light source 26'; mirrors 34', 36', and 68; and filter assembly 38' are coupled together to form a scanning assembly 74 which is movable along a first axis A1. The movable mirrors 70 and 72 are coupled together to form a reflecting assembly 76 which is movable along a second axis A2. The scanning assembly 74 can be caused to move to the right along axis A1 with twice the velocity that reflecting assembly 76 moves to the right along axis A2. Axes A1 and A2 are substantially parallel to each other and to the platen 22'.

In operation, the paper 66 is placed, image side down, on the transparent platen 22', and is held immobile by some suitable means, such as an elastomer cover (not show). The scanning assembly 74 is then caused to move from left to right along axis A1 to input a sequence of scan lines of the color image on paper 66. Simultaneously, the reflection assembly 76 moves along axis A2 with one-half the velocity as scanning assembly 74 to maintain a constant total path length from the object plane O' to the sensor assembly 18', so that the projected image is always in focus. At the end of the scan, the scanning assembly 74 and the reflecting assembly 76 are substantially in the position shown in broken lines.

The beam forming assembly 14' operates in substantially the same manner as its counterpart in the previously described embodiment of FIG. 1. Also, the projection assembly 16' and the sensor assembly 18' operate in a manner analogous to their counterparts in the embodiment of FIG. 1. It is therefore intended that the descriptions of those analogous members of FIG. 1 serve as descriptions of their counterparts of FIG. 2.

While this invention has been described with reference to several preferred embodiments, it is contemplated that various alterations and permutations of the invention will become apparent to those skilled in the art upon a reading of the precednng descriptions and a study of the drawing. It is therefore intended that the scope of the present invention be determined by the following appended claims.

What is claimed is:

1. A color image input apparatus comprising:
   a light source;
   sensor means including a first photosensitive means, a second photosensitive means, and a third photosensitive means;
   platen means disposed proximate said light source, said platen means being adapted to support an item having a color image provided on a surface thereof;
   beam forming means located between said platen means and said sensor means and adapted to develop a first beam, a second beam, and a third beam from light from a portion of said color image illuminated by said light source, wherein said first beam includes light which is primarily in a first frequency range, said second beam includes light which is primarily in a second frequency range, and said third beam includes light which is primarily in a third frequency range, said beam forming means including reflective means and filtering means, wherein said reflective means is located between said platen means and said filtering means and includes a pair of mirrors, each of which produces a virtual image of said portion of said color image, wherein said filter means includes three filter windows associated with said first beam, said second beam, and said third beam, respectively; and
   projection means located between said beam forming means and said sensor means for projecting said first beam onto said first photosensitive means, said second beam onto said second photosensitive means, and said third beam onto said third photosensitive means, wherein apertures of said filter windows and said projection means subtend substantially the same angle.

2. A color image input apparatus as recited in claim 1 wherein apertures of said mirrors subtend substantially the same angle subtended by the apertures of said filter windows and said projection means.

3. A color image apparatus as recited in claim 1 wherein platen means is provided with an elongated slot, said portion of said color image being aligned with said slot.

4. A color image input apparatus as recited in claim 3 further comprising transport means for moving said item such that said color image moves past said elongated slot.

5. A color image input apparatus as recited in claim 1 further comprising beam directing means disposed between said beam forming means and said projection means.

6. A color image input apparatus as recited in claim 5 wherein said beam directing means includes second reflective means.

7. A color image input apparatus as recited in claim 6 wherein said beam forming means is movable along a first axis which is substantially parallel to a planar surface of said platen means.

8. A color image input apparatus as recited in claim 7 wherein said second reflective means includes first movable mirror means and second movable mirror means, wherein said first movable mirror means travels with said beam forming means.

9. A color image input apparatus as recited in claim 8 wherein said second movable mirror means is movable along a second axis which is substantially parallel to said first axis.

10. A color image input apparatus as recited in claim 9 wherein said beam forming means and said first movable mirror means are adapted to travel along said first axis twice as fast as said second movable mirror means travels along said second axis.

11. A color image input apparatus as recited in claim 8 wherein said light source travels with said beam forming means.

12. A color image input apparatus as recited in claim 11 wherein said platen means, said projection means, and said sensor means are substantially stationary.

13. A color image input apparatus as recited in claim 12 wherein said platen means includes a transparent window portion through which light may travel to and from said color image, said window portion having dimensions at least as large as the dimensions of said item.

* * * * *

UNITED STATES PATENT AND TRADEMARK OFFICE
CERTIFICATE OF CORRECTION

PATENT NO. : 4,783,696

DATED : November 8, 1988

INVENTOR(S) : Hans D. Neumann and Anatoly Rabinovich

It is certified that error appears in the above-identified patent and that said Letters Patent is hereby corrected as shown below:

In the Abstract, Line 1, "color input image" should read -- color image input --;

Column 1, Line 15, "uuch" should read -- such --;

Column 3, Line 39, "42, aand" should read -- 42, and --;

Column 4, Line 48, "show" should read -- shown --;

Column 5, Line 3, "precednng" should read -- preceding --;

Column 6, Line 4, "platen" should read -- said platen -- .

Signed and Sealed this

Twentieth Day of June, 1989

Attest:

DONALD J. QUIGG

*Attesting Officer*  *Commissioner of Patents and Trademarks*